United States Patent [19]
Nower et al.

[11] Patent Number: 5,526,282
[45] Date of Patent: Jun. 11, 1996

[54] ALIGNMENT ANALYZER WITH GRAPHICAL ALIGNMENT TOLERANCE DISPLAY

[75] Inventors: Daniel L. Nower, Knoxville; Willie T. King, Powell; Kenneth R. Piety, Knoxville, all of Tenn.

[73] Assignee: Computational Systems, Inc., Knoxville, Tenn.

[21] Appl. No.: 72,316

[22] Filed: Jun. 3, 1993

[51] Int. Cl.⁶ .............................. G01B 5/25; G01B 7/31
[52] U.S. Cl. ..................... 364/507; 364/561; 364/559; 33/412
[58] Field of Search .................... 364/507, 508, 364/506, 551.01, 551.02, 561, 188, 559; 33/412, 645; 73/66, 462

[56] References Cited

U.S. PATENT DOCUMENTS

| | | | |
|---|---|---|---|
| 3,252,158 | 8/1970 | Torlay | 33/655 |
| 3,789,507 | 2/1974 | Murray, Jr. | 33/15 D |
| 4,148,013 | 4/1979 | Finn et al. | 340/870.11 |
| 4,367,594 | 1/1983 | Murray, Jr. | 33/661 |
| 4,428,126 | 1/1984 | Banks | 33/412 |
| 4,463,438 | 1/1984 | Zatezalo et al. | 364/710.02 |
| 4,586,264 | 5/1986 | Zatezalo et al. | 33/412 |
| 4,623,979 | 11/1986 | Zatezalo et al. | 364/561 X |
| 5,026,998 | 6/1991 | Hölzl | 250/561 |
| 5,056,237 | 10/1991 | Saunders | 33/645 |
| 5,115,406 | 5/1992 | Zatezalo et al. | 364/551.01 |
| 5,185,937 | 2/1993 | Piety et al. | 33/645 |
| 5,299,143 | 3/1994 | Hellinga et al. | 364/561 |

OTHER PUBLICATIONS

*Shaft Alignment Handbook*, J. Piotrowski, Copyright 1986. pp. 85–86.

*Alignment Manual for Horizontal, Flexibly Coupled Rotating Machines*, 3rd Edition, M. Murray, Jr., Copyright 1983. p. 31.

*Total Alignment*, V. R. Dodd, Copyright 1974. pp. II–2, II–3, II–4.

"Coupling Alignment: the Reverse Indicator Method Simplified", Bolam, *P/PM Technology*, Jul./Aug. 1990, pp. 16–23.

"Aligning Shafts—Part 1, Measuring Misalignment", Durkin, *Plant Engineering*, Feb. 8, 1979, pp. 102–105.

"Aligning Shafts—Part 2, Correcting Misalignment", Durkin, *Plant Engineering*, Feb. 8, 1979, pp. 102–105.

*Primary Examiner*—Emanuel T. Voeltz
*Assistant Examiner*—M. Kemper
*Attorney, Agent, or Firm*—Luedeka, Neely & Graham

[57] ABSTRACT

An alignment analyzer for facilitating the alignment of a machine set including co-rotatable in-line shafts includes a display device on which separate offset misalignment and angle misalignment components are displayed as a single point in an x–y coordinate system. The coordinates of the point are the individual misalignment components. Also displayed on the display device are curves representing "acceptable" and "excellent" tolerance ranges. The displayed point and the curves together indicate whether the combined offset and angular misalignment is within or without the "acceptable" tolerance range, and whether the combined offset and misalignment is within or without the "excellent" tolerance range. Also disclosed is a method whereby the amounts of offset and angular misalignment in a given plane are computationally combined to determine a combined misalignment amount for that plane, and then compared either to a value representing a tolerance limit for "acceptable" alignment, to a value representing a tolerance limit for "excellent" alignment, or to both values.

11 Claims, 8 Drawing Sheets

ALIGNMENT ANALYZER WITH GRAPHICAL ALIGNMENT TOLERANCE DISPLAY

BACKGROUND OF THE INVENTION

The present invention relates generally to the art of aligning, employing a suitable alignment fixture, machine sets including first and second rotatable machine shafts which are coupled together for operation by means of a shaft coupling. More particularly, the invention relates to a method for determining whether alignment is at least acceptable, and to an alignment analyzer including a display for graphically displaying the amount of misalignment in a meaningful manner. Although disclosed herein in the context of aligning co-rotatable in-line machine shafts, the invention is applicable to a wide variety of other configurations of both co-rotatable and independently rotatable shafts, including without limitation parallel shafts, shafts coupled by right angle gear boxes, vertical machines, and machine trains of three or more components.

The invention herein is related to the invention of Daniel L. Nower, Willie T. King and Kenneth R. Piety, U.S. application Ser. No. 08/072,397, filed Jun. 3, 1993, concurrently herewith, entitled "CENTRALIZED ALIGNMENT MANAGEMENT SYSTEM", the entire disclosure of which is hereby expressly incorporated by reference.

As is well known, whenever two rotating machine shafts are coupled together, such as the shaft of an electric motor and the shaft of a pump, it is important that the shafts be aligned within predetermined tolerances. Such shafts, when in perfect alignment, have their extended center lines (axes of rotation) coinciding along a straight line. Misalignment can lead to vibration, excessive wear, and ultimate destruction of couplings, bearings, seals, gears and other components.

A number of methods are known for checking the alignment of machine sets, and for performing an alignment job if required. These methods generally have in common the use of suitable alignment fixtures, also termed alignment brackets. The alignment fixtures are employed to measure particular relative displacements (also termed offsets) as the shafts are rotated together through one revolution, while stopping for example at 0°, 90°, 180° and 270° rotational positions to take offset readings. Each relative displacement is measured between a point referenced to one of the shafts by means of the alignment fixture and a point on the other shaft. Dial indicators are often employed, these dial indicators having a plunger which either moves a hand on the face of an analog dial indicator, or causes an indication on the display of a digital indicator.

Based on the measured offsets, the amount of misalignment can be calculated, and a determination made regarding whether the alignment is within tolerances. If the alignment is not within tolerances, then the measured offsets are used to calculate machine moves which will tend to bring the shafts into alignment, which machine moves are then accomplished. The 0°, 90°, 180° and 270° rotational positions at which readings are conventionally taken lie in geometric planes in which either of the machines, for example the motor, may be moved for purposes of alignment. In particular, the mounting bolts of the machine are loosened and the machine is either moved in a horizontal plane; or the machine is moved in a vertical plane by placing or removing shims under one or more of the feet of the machine; or both. There are well developed calculation methods and procedures known in the art for determining what machine moves to make to achieve an aligned condition based on measurement of relative displacement (offset) data at a plurality of shaft angular positions.

After a machine move has been accomplished, the alignment fixture is again employed to measure offset data, and it is again determined whether the alignment is within tolerances. Further machine moves are calculated and made as necessary. Thus the process is an iterative one. There are several reasons for the iterative nature of the process. For example, misalignments in the horizontal and vertical planes are separately considered, but they are interactive. Thus, machine moves resulting in an improvement in alignment in one plane may adversely affect alignment in the other plane.

Various machine set alignment approaches are described in greater detail in Piety et al U.S. application Ser. No. 07/892,587, filed Jun. 3, 1992, now U.S. Pat. No. 5,263,261, entitled "SHAFT ALIGNMENT DATA ACQUISITION", the entire disclosure of which is hereby expressly incorporated by reference. Alignment approaches include the reverse indicator method wherein a suitable alignment fixture or bracket is employed to measure a pair of relative displacements (offsets) in a radial direction at a plurality of shaft angular positions, and the face-and-rim method. The "rim" part of the face-and-rim method is measurement of a relative displacement (offset) in a radial direction (the same as one of the offsets measured in the practice of the reverse indicator method), and the "face" part of the face-and-rim method is measurement of a relative displacement in an axial direction. Traditionally, offset measurements are made at the 0°, 90°, 180° and 270° rotational positions, as this facilitates calculation of machine moves required to bring the machine sets and thus the shafts into alignment. However, and as is disclosed in the above-incorporated U.S. application Ser. No. 07/892,587, now U.S. Pat. No. 5,263,261, offset data may be collected at a plurality of arbitrary measurement positions, with a minimum of three measurement positions.

The determination of whether alignment is or is not acceptable implies the ability to express an "amount" of misalignment, preferably in a manner amenable to straightforward comparison to predefined tolerances. There are a number of prior art approaches to expressing the "amount" of misalignment, and for accordingly determining whether alignment is within tolerances, or whether machine moves are required to correct excessive misalignment.

One such approach is known as Total Indicator Runout. A problem, however, with this particular approach is that the "amount" of misalignment expressed is dependent upon the alignment fixture set up and on the size of the machines being aligned. Thus, particular misalignment tolerance limits are nearly impossible to predefine.

Another approach is to express centerline offsets in terms of mils per inch, which is a way of expressing the slope of a line between flexure planes, where the line is angled to connect the points where the centerlines of the two shafts intersect respective flexure planes. (It is said that every coupling has two flexure planes.) This approach to expressing the "amount" of misalignment is employed in the "Bulletin No. 5" supplement dated May 22, 1985 to "Alignment Manual for Horizontal Flexibly-Coupled Rotating Machines", 3rd edition, by Malcolm G. Murray, Jr. One disadvantage is that it is often difficult to determine the exact location of each flexure plane. These exact locations are needed in order to calculate the slope between the flexure planes.

The problem of how to express the "amount" of misalignment and, more particularly, how to define acceptable alignments within predetermined tolerances is discussed in detail in Zatazelo U.S. Pat. No. 4,586,264, entitled "METHODS FOR MEASURING ALIGNMENT OF COUPLED SHAFTS." The approach there described is to express offset misalignment and angle misalignment (angularity) separately at the coupling center. ("Angularity" in this context, while typically specified in units of mils per inch, is entirely different from the mils per inch used to specify centerline offset between flexure planes, as briefly described just above.) Thus, the offset and angularity approach recognizes that there are two relevant misalignment components. Either or both may be present in a given situation. In the case of offset misalignment, shaft centerlines may be parallel, but they do not intersect. Angular misalignment occurs when shafts intersect at an angle. Angular misalignment is manifested as a difference in distance between coupling hub faces across a diameter of the coupling hub faces.

However, specifying offset misalignment and angle misalignment still does not express a single "amount" of misalignment. With prior art approaches, angularity and offset misalignment values are separately compared to respective tolerance limits for the two types of misalignment.

SUMMARY OF THE INVENTION

Accordingly, it is an object of the invention to provide a method for meaningfully expressing a single "amount" of misalignment.

It is a related object of the invention to provide a method for expressing a single "amount" of misalignment in a manner which is amenable to straightforward comparison to predefined tolerances.

It is another object of the invention to provide an alignment analyzer including a display device on which a single "amount" of misalignment, combining the separate offset misalignment and angular misalignment components, can be meaningfully and graphically displayed with reference to predefined tolerances.

It is a related object of the invention to provide an alignment analyzer in which the combined offset and angular misalignment is meaningfully displayed with reference to "acceptable" and "excellent" tolerance ranges.

Briefly, and in accordance with one aspect of the invention, there is provided a method for determining whether the alignment of a machine set including first and second rotatable shafts connected respectively to first and second machines is at least "acceptable", and possibly "excellent". In accordance with the method, an alignment fixture is employed to measure a pair of offsets at a plurality of shaft angular positions to establish a measured data set. Then, based on the measured data set, the amount of offset misalignment, if any, and the amount of angular misalignment, if any, of the shafts are calculated in at least one plane. The amounts of offset and angular misalignment are combined to determine a combined misalignment amount in the one plane. The combined misalignment amount is compared to a value representing a tolerance limit for "acceptable" alignment, and, preferably, also to a value representing a tolerance limit for "excellent" alignment. The tolerance limit values for acceptable and for excellent alignment are based on shaft rotational speed during normal operation.

Briefly, and in accordance with another aspect of the invention, there is provided an alignment analyzer for facilitating the alignment of at least one machine set including first and second rotatable shafts connected respectively to first and second machines. The alignment analyzer is employed in conjunction with an alignment fixture for measuring a pair of offsets at a plurality of shaft angular positions to establish a measured data set. The alignment analyzer includes a display device capable of displaying a graphical representation in a coordinate system, such as an x–y coordinate system. The alignment analyzer additionally includes elements operable to calculate, based on the measured offset data set, the amount of offset misalignment, if any, and the amount of angular misalignment, if any, of the shafts in at least one plane, and to display combined offset and angular misalignment as a point in the coordinate system on the display device. Thus, in an exemplary case where an x–y coordinate system is employed, the x-coordinate (along the horizontal axis) of the point is the amount of offset misalignment, expressed in mils, and the y-coordinate (along the vertical axis) of the point is the amount of angle misalignment, expressed for example in mils per inch. Preferably, the elements within the alignment analyzer are operable to calculate, based on the measured data set, the amount of offset misalignment, if any, and the amount of angular misalignment, if any, of the shafts in each of two planes, and to selectively alternately display combined offset and angular misalignment for the planes as respective points in the x–y coordinate system on the display device.

The elements within the alignment analyzer are further operable to display in the coordinate system on the display device a curve representing an "acceptable" tolerance range and, preferably, another curve representing an "excellent" tolerance range. The displayed point and the curves accordingly together indicate whether the combined offset and angular misalignment the particular plane is within or without the "acceptable" tolerance range, and whether the combined offset and misalignment for the particular plane is within or without the "excellent" tolerance range.

The displayed curve representing an "acceptable" tolerance range is at least a portion of an ellipse having axes defined as offset misalignment and angular misalignment limit values along the x and y axes of the x–y coordinate system, and the curve representing the "excellent" tolerance range likewise is a portion of an ellipse having axes defined as offset misalignment and angle misalignment limit values along the x and y axes of the x–y coordinate system. The offset misalignment and angular misalignment limit values defining the "acceptable" tolerance range ellipse axes and the offset misalignment and angular misalignment limit values defining the "excellent" tolerance range ellipse axes preferably are based on shaft rotational speed during normal operation.

Preferably, the alignment analyzer includes a memory for storing a plurality of combined offset and angular misalignment data points for the machine set corresponding to a plurality of measured data sets established during the course of aligning the machine set, and the plurality of offset and angular misalignment data points are simultaneously displayed on the display device as points in the x–y coordinate system to graphically depict a history of a particular alignment job.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description, taken in conjunction with the drawings, in which:

DETAILED DESCRIPTION

Figure 1:
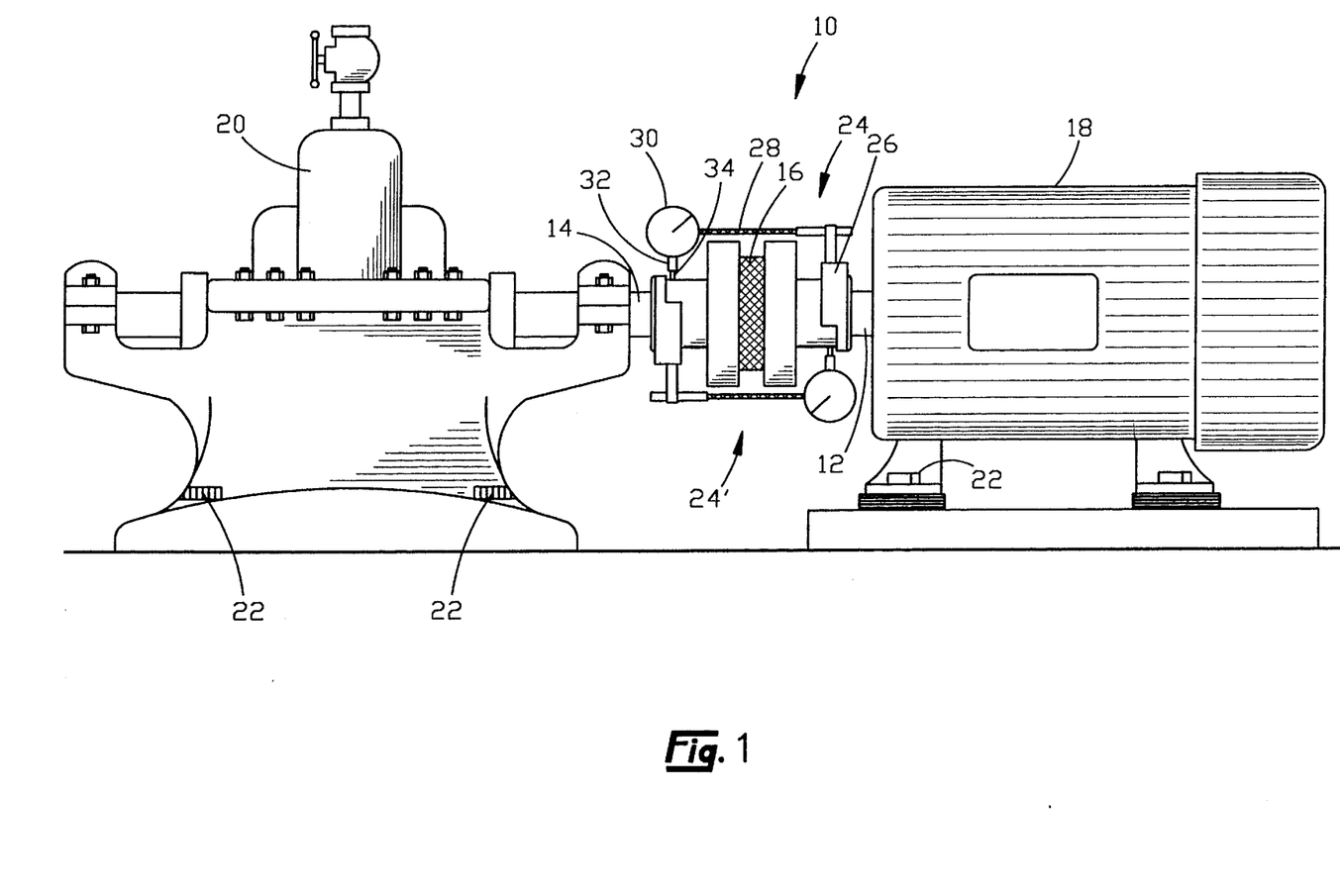
FIG. 1 depicts in overview the general environment of a machine set including first and second co-rotatable in-line shafts connected respectively to first and second machines, with a dial indicator type alignment fixture spanning the coupling for measuring relative displacement (offset) at various shaft angular positions.

Referring initially to FIG. 1, the general environment in which the invention may be employed is a factory or plant typically including a number of rotating machine sets, such as representative machine set 10. The machine set 10 includes first and second co-rotatable in-line shafts 12 and 14 connected to each other by means of a coupling 16. The shafts 12 and 14 are connected respectively to first and second rotating machines 18 and 20, in the representative form of a motor 18 driving a pump 20. It will be appreciated that the shafts 12 and 14 actually comprise elements of the respective machines 18 and 20.

The machines 18 and 20 are secured to a floor or other underlying support by means of bolts 22. As is well known, for alignment purposes, the bolts 22 can be loosened, and either or both of the machines, typically the motor 18, can be moved in horizontal and vertical planes in order to achieve alignment between the shafts 12 and 14 of the machine set 10 within predetermined tolerances. As are shown under the feet of the motor 18, shims are employed to selectively raise and lower mounting points for the machines 18 and 20 during an alignment procedure.

Also shown in FIG. 1 are a pair of typical alignment fixtures 24 and 24'. The fixture 24 has a base 26 fixed to the first shaft 12, an extension bar 28 extending generally parallel to the shafts 12 and 14 over the coupling 16, and a dial indicator 30 having a plunger 32 contacting the periphery of a portion of the second shaft 14 at a point 34, which portion happens to be a hub of the coupling 16. It will be appreciated that the base 26 and extension bar 28 together serve to define a reference point over the point 34 on the second shaft 14, which reference point is referenced to the first shaft 12. As the shafts 12 and 14 are rotated together, relative displacement in a radial direction (radial offset) between the reference point and the point 34 on the shaft 16 is measured at various angular positions, to thus collect a set of offset data. This offset data directly reflects distance and direction of the distance between the extended centerlines of the two shafts 12 and 14 in the transverse plane containing the measurement point.

In accordance with the reverse indicator alignment method, in order to have sufficient data for determining alignment moves, a second set of offset data must be collected in another transverse plane, in addition to the transverse plane containing the point 34. Although such data could be taken by extending the extension bar 28, conventionally the second set of data is taken by an alignment fixture extending in the opposite direction, that is, fixed to the second shaft 14 and extending laterally to a reference point over a point on the first shaft 12. A single alignment fixture 24 may be employed, and moved from one side to the other, or a pair of alignment fixtures 24 and 24' may be employed for simultaneous readings, as represented in FIG. 1. Preferably, however, a combination alignment fixture is employed for simultaneous readings, such as is described hereinbelow with reference to FIG. 4. When a pair of alignment fixtures 24 and 24' are employed, they typically are positioned on opposite sides of the shafts, that is, 180° apart for "out of phase" readings. However, they may also be positioned immediately adjacent each other for "in phase" readings. The preferred combination alignment fixture of FIG. 4 serves to acquire "in phase" readings.

Although the alignment fixturing in FIG. 1 is for the reverse indicator method, the system of the invention is not limited to implementations of this particular method. Various forms of the face-and-rim method may be employed wherein one offset is a radial offset, and the other is an axial offset. Analysis procedures for a number of specific methods are well developed.

It should be noted that another relevant factor is known as "sag", which is a result in part of beam deflection of the extension bar 28 under force of gravity. To achieve an accurate alignment, sag is a factor which must be independently measured and taken into account in making calculations, as is well known in the art. One method of determining sag is disclosed in Piety et al U.S. Pat. No. 5,185,937, entitled "ALIGNMENT BRACKET ASSEMBLY INTEGRITY CHECK AND SAG DETERMINATION".

Figure 2:
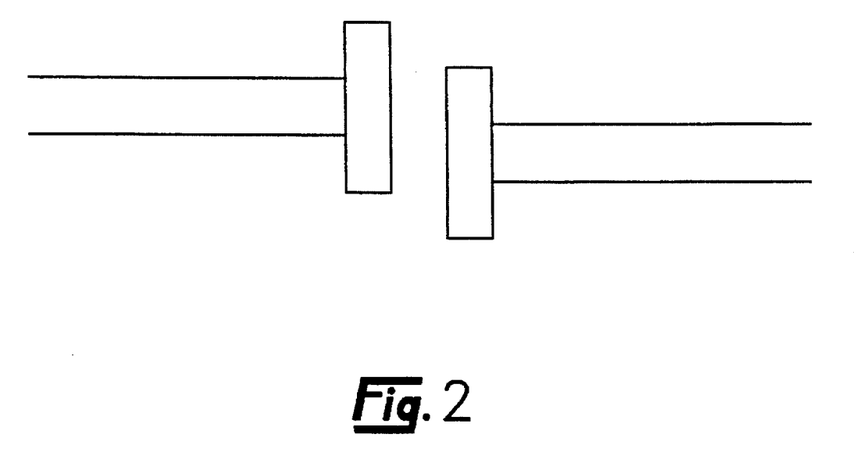
FIG. 2 depicts offset misalignment.
Figure 3:
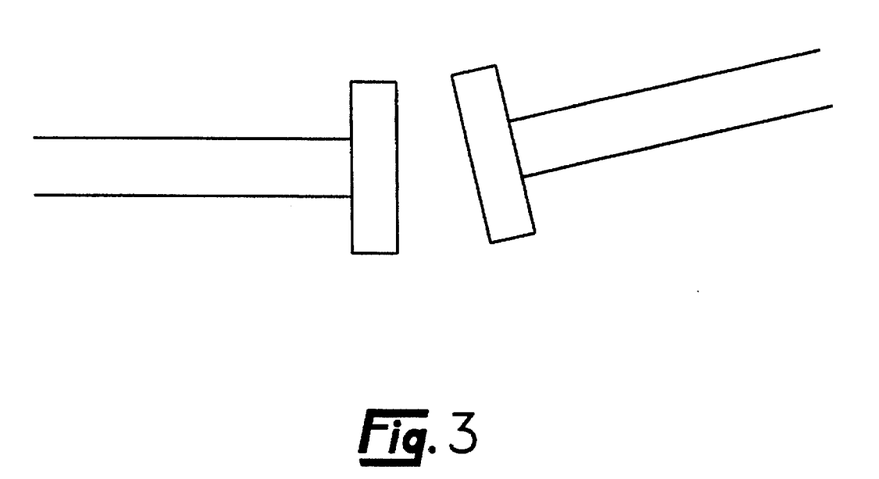
FIG. 3 depicts angular misalignment.

FIG. 2 illustrates the misalignment component alternatively known as offset misalignment, offset, or parallel misalignment. FIG. 3 illustrates the misalignment component alternatively known as angular misalignment or angularity. Preferably, offset is determined with reference to the axial center of the coupling (angularity is the same at any axial location), as this makes feasible the specification of predetermined tolerances. Either or both of these misalignments may be present in a given situation, and they may exist in any plane. In most situations, the misalignment can be corrected by proper moves of one of the machines in vertical and horizontal planes, including the use of shims to raise and lower individual mounting feet of a particular machine.

Figure 4:
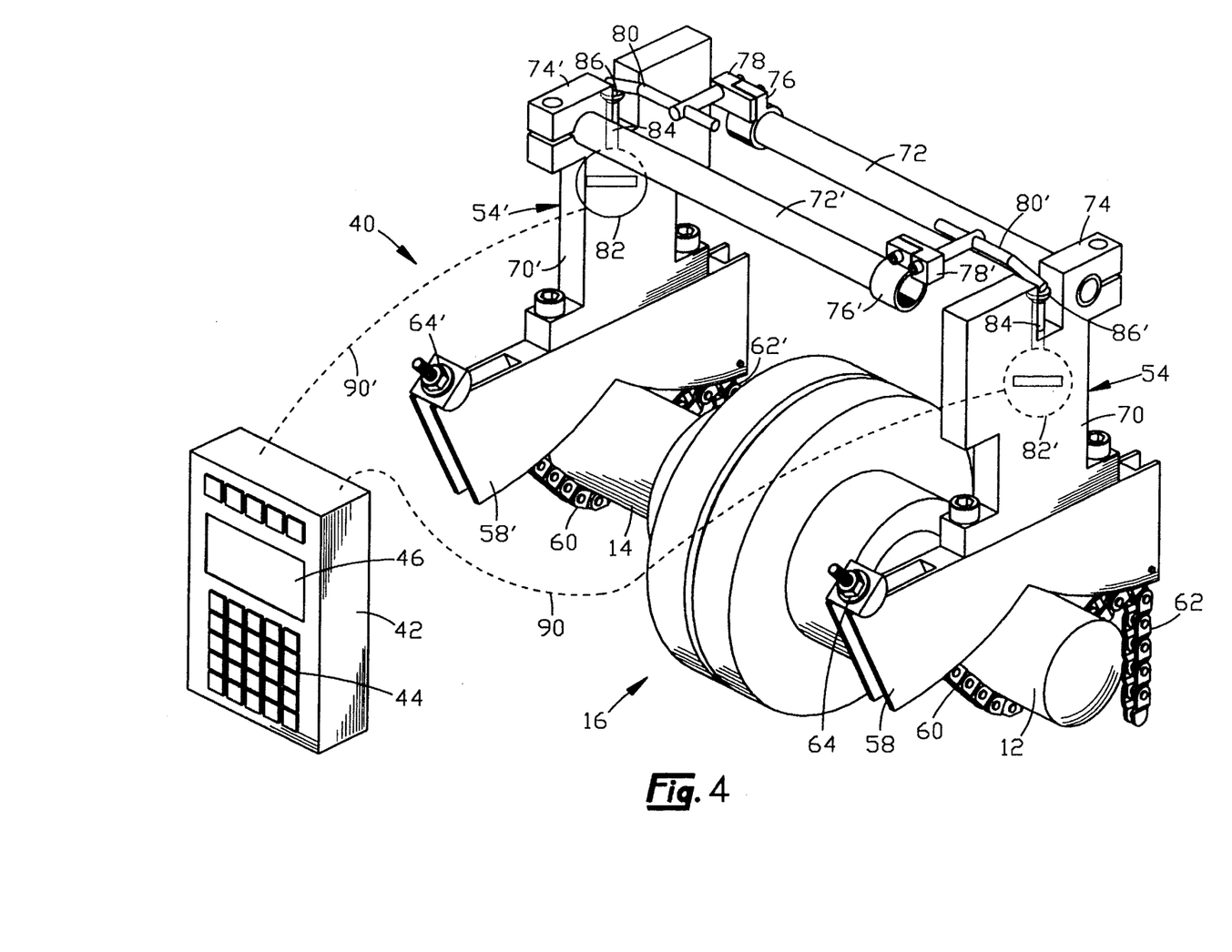
FIG. 4 is an enlarged three-dimensional view of a preferred form of alignment fixture in place over the coupling portion of the machine set of FIG. 1, with a portable alignment analyzer in use.

FIG. 4 depicts a preferred form of a combination alignment fixture 40 for measuring a pair of offsets at a plurality of shaft angular positions. Also shown in FIG. 4 is a portable alignment analyzer 42 for recording measured offset data, for calculating and displaying the amount of misalignment, and for calculating machine moves tending to bring the shafts 12 and 14 of the machine set 10 into alignment. The portable alignment analyzer 42 includes a keypad 44 for user data entry, and a display device 46 capable of displaying a graphical representation. Preferably the display device 46 is a liquid crystal display, such as EPSON model no. EG4401Y-ER.

In an overview of use, a user employs the alignment fixture 40 to measure a pair of radial offsets at a plurality of angular positions and enters them into the portable alignment analyzer 42 employing the keypad 44, thus establishing a measured data set. From the measured data set, the alignment analyzer 42 calculates the offset and angular misalignment components in each of the horizontal and vertical planes, and graphically displays combined offset and angular misalignment for each of the respective planes as a point in an x–y coordinate system on the display device 46, in a manner described hereinbelow in detail with reference to FIGS. 12 and 13. As is also described hereinbelow in detail, curves representing "acceptable" and "excellent" tolerance ranges are presented on the display device 46 simultaneously with the displayed points such that the user can readily and visually determine whether alignment is within the "acceptable" and "excellent" tolerance ranges for the two planes. The offset and angle misalignment components may also be individually displayed in text form on the display device 46.

Based on this display, the user then decides whether to improve the alignment by performing machine moves. The portable alignment analyzer 42 also serves to calculate and display machine moves which will tend to bring the shafts 12 and 14 of the machine set 10 into alignment.

Considering the combination alignment fixture 40 in detail, the fixture 40 has first and second fixture elements 54 and 54' respectively mountable to the first and second shafts 12 and 14. In particular, the first fixture element 54 comprises a suitably configured mounting block 58 secured to the shaft 12 by means of a chain 60 and swing link 62 adjustably connected to one end of the chain, and a tightening device 64 connected to the other end of the chain 60. The second fixture element 54' correspondingly comprises a suitably configured mounting block 58', a chain 60', a swing link 62' and a chain tightening device 64'.

Attached to the mounting blocks 58 and 58' are respective sensor heads 70 and 70'. Although not depicted in FIG. 4, spacer blocks may be employed between the sensor heads 70 and 70' and the mounting blocks 58 and 58' in order to provide clearance around a large coupling 16. Such spacer blocks (not shown) may be provided as a set of different height spacer blocks for selective use to adopt the fixture 40 to various coupling situations.

The particular fixture 40 depicted in FIG. 4 facilitates measurement of a pair of radial offsets at each of a plurality of measurement angular positions as the shafts 12 and 14 are rotated together. Thus, a first extension bar 72 is firmly affixed to the first sensor head 70 by means of an extension bar clamp 74, and the first extension bar 72 extends over the coupling 16, generally parallel to the shafts 12 and 14, to a point over the second shaft 14. Secured to the distal end 76 of the extension bar 72 by an adjustable attachment element 78 is an adjustable tip element 80, the end of which is fixedly referenced, neglecting sag, to the first shaft 12. The tip element 80 thus defines a reference point referenced to the first shaft 12, and is positioned over a particular point on the second shaft 14. The extension bar clamp 74 and the attachment 78 for the tip element 80 are adjustable to adapt the fixture 40 to various coupling situations.

Correspondingly, firmly affixed to the second sensor head 70' is a second extension bar 72'. The second sensor head 70' and second extension bar 72' are essentially identical to the first sensor head 70 and first extension bar 72, but in the opposite orientation. Elements associated with the second extension bar 72' and corresponding with like elements of the first extension bar 72 as described hereinabove include a second extension bar clamp 74', a distal end 76', an adjustable attachment element 78', and an adjustable tip element 80' which defines a reference point referenced to the second shaft 14 and positioned over a particular point on the first shaft 12.

Included within the sensor heads 70 and 70' are respective digital indicators 82' and 82 having respective plunger-like connecting rods 84' and 84 terminating in respective tips 86' and 86 which engage the tip elements 80' and 80 attached to the extension bar 72' or 72 affixed to the opposite sensor head 70' or 70. The connecting rods 84 and 84' are lightly spring loaded such that the extension bar tip elements 80 and 80' and the respective tips 86 and 86' are in contact at all times during a measurement operation, and the tips 86, 86' and connecting rods 84, 84' translate as the distance between the extension bar tip elements 80 and 80' and the shafts 14 and 12 varies in a radial direction during shaft rotation.

The digital indicators 82 and 82' are preferably digital electronic indicators having digital readout displays with a resolution of 0.5 mil, such as Mitutoyo model no. 543-611. These particular indicators 82 and 82' additionally can serve as electronic transducers, and include cable connections. Thus, offset data is either manually entered into the portable alignment analyzer 42 via the keypad 88 as described hereinabove, or directly acquired via optional cables 90 and 90', shown in dash lines, connected between the transducer-type digital indicators 82 and 82' and the portable alignment analyzer 42, or via a wireless (e.g. optical or radio) data link.

As an alternative to the alignment fixture 40 employing extension bars 72, 72' and digital indicators 82, 82' with connecting rods 84, 84' a laser-based alignment fixture (not shown) may be provided, employing a laser and a light-sensitive target.

Figure 5:
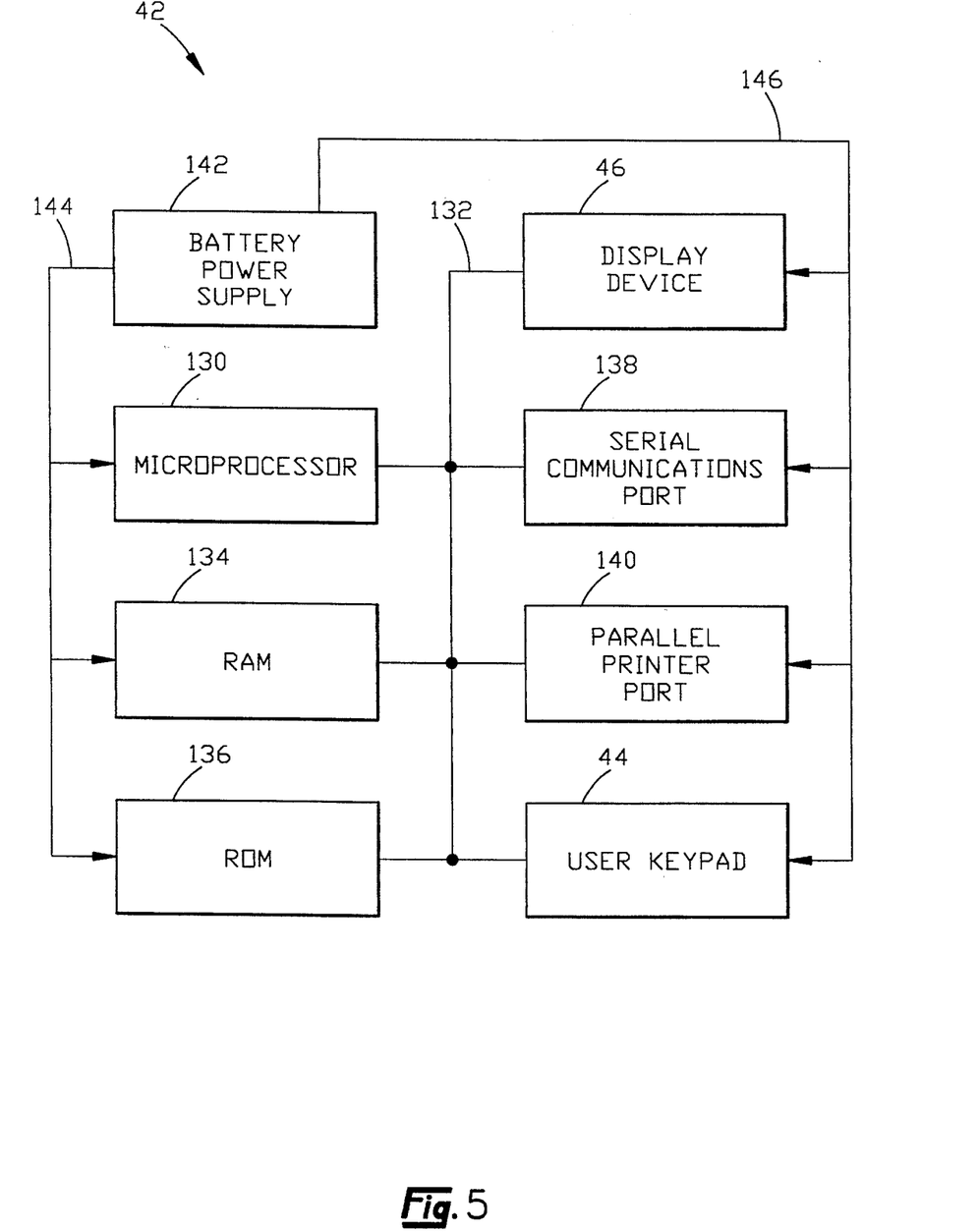
FIG. 5 is a highly schematic block diagram of the portable alignment analyzer, which comprises a microprocessor-based system.
Figure 6:
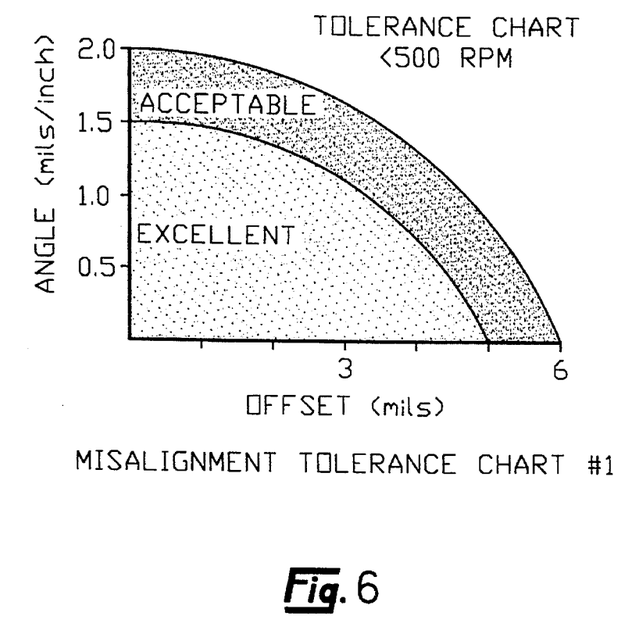
FIGS. 6–11 are graphical tolerance charts recommended for various RPM ranges.
Figure 7:
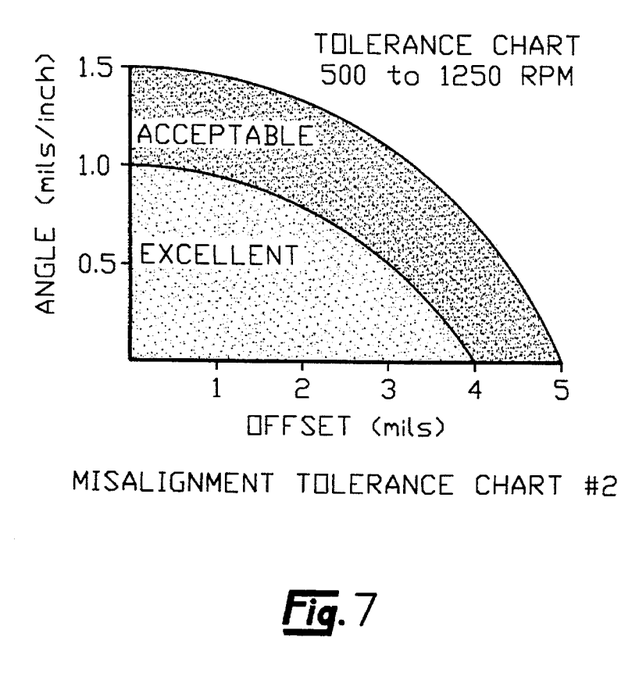
Figure 8:
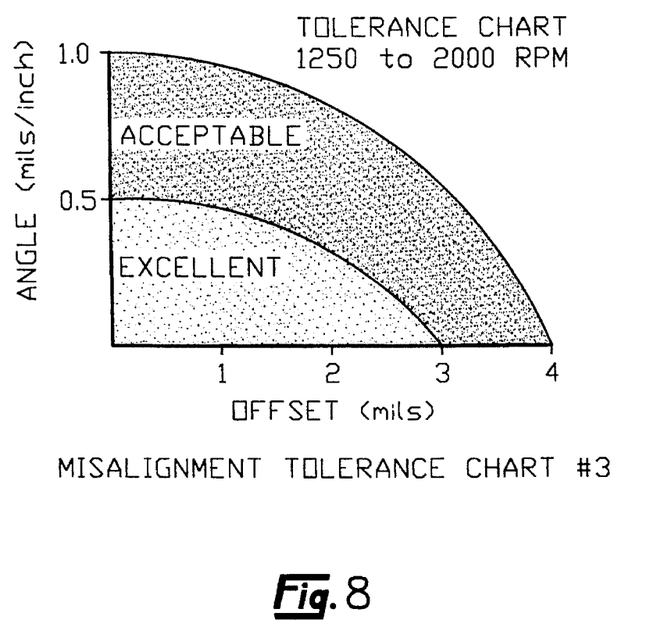
Figure 9:
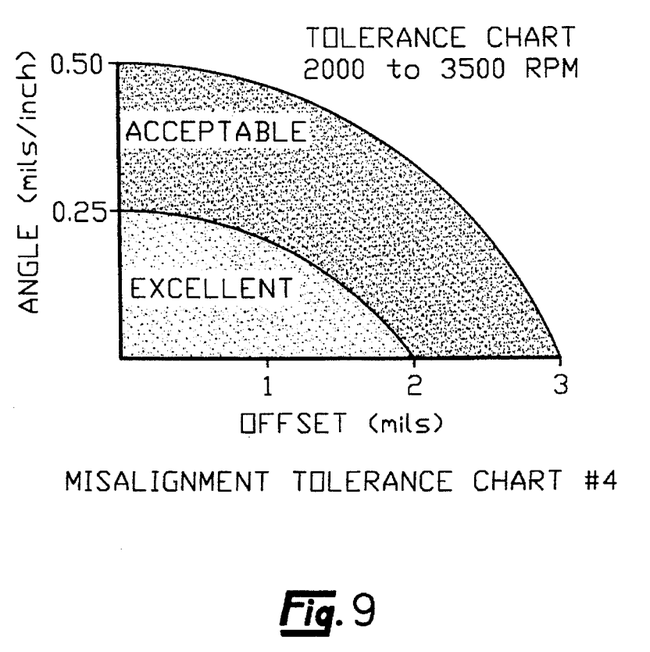
Figure 10:
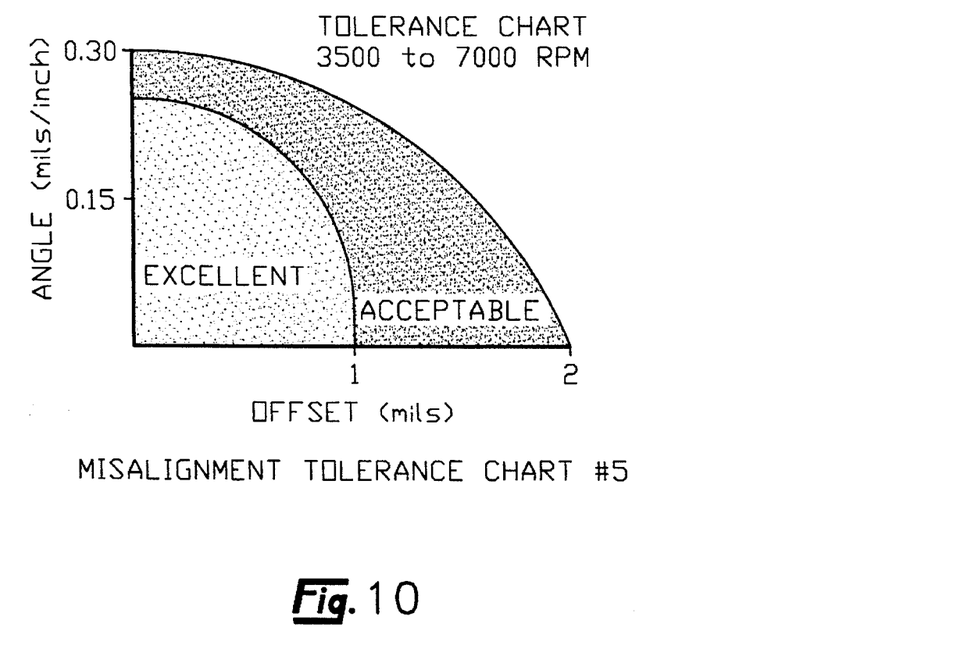
Figure 11:
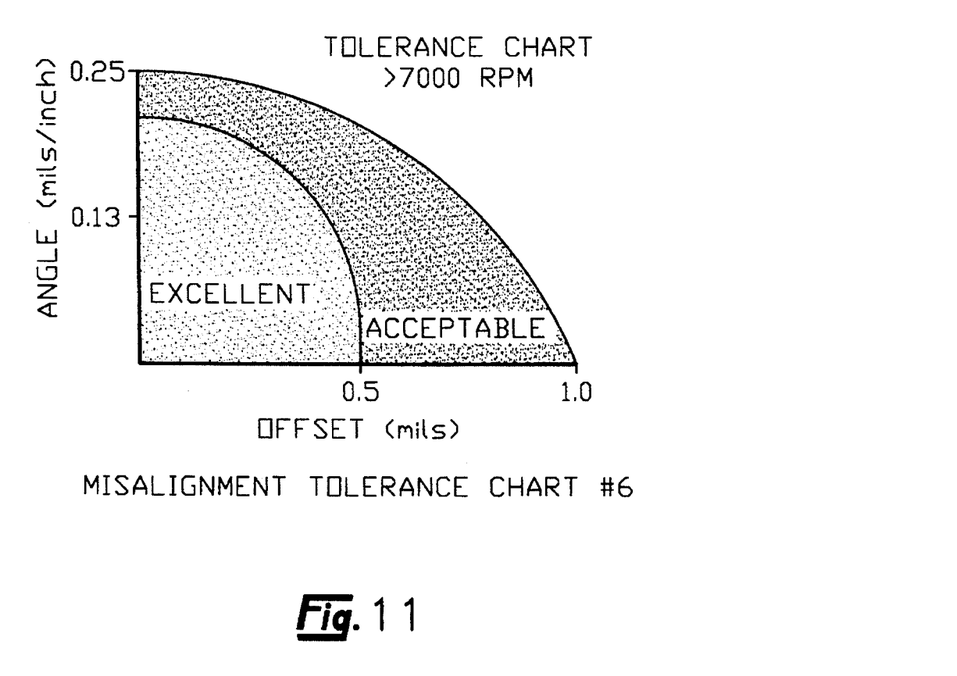

FIG. 5 is a diagram of the internal arrangement of the portable alignment analyzer 42, which may be seen to comprise a conventional microprocessor-based system including a microprocessor 130, such as an Intel 8080 microprocessor or a Zilog Z80 microprocessor, connected to a conventional microprocessor bus 132. Other devices are connected to the bus 132, and are suitably addressed by the microprocessor 130, as is conventional in such systems. These devices include a random access memory (RAM) 134 in which data are stored and, in some cases, program instructions for the microprocessor 130; and a read only memory (ROM) 136 which includes program instructions for the microprocessor 130 or, at the very least, minimal start-up instructions.

Other devices connected to the microprocessor bus 132 include the user keypad 88, a serial communications port 138, and a parallel printer port 140. Finally, a battery power supply 142 supplies power to the remaining elements through representative supply conductors 144 and 146.

Considering the operation in greater detail, after the user has employed the alignment fixture 40 to measure a pair of radial offsets at a plurality of shaft angular positions, thereby establishing a measured data set which is entered into the portable alignment analyzer 42 either via the keypad 88 or by direct data acquisition, the components within the portable alignment analyzer 42 then calculate, based on the measured data set, the amount of offset misalignment, if any, and the amount of angular misalignment, if any, of the shafts in the horizontal plane and in the vertical plane.

In each plane, the combination of offset misalignment and angle misalignment is a direct indication of the alignment condition in the particular plane. Optimum alignment occurs when offset and angle are zero. In most cases, that degree of accuracy is not reached. Thus, tolerances are used to set an achievable goal.

In some cases, tolerance limits are established by the original manufacturer of the equipment being aligned, or tolerance limits may be developed through experience for a particular installation. In any event, once predetermined tolerance targets are reached, the machinery should operate correctly without any adverse effects from misalignment.

If tolerance limits are not otherwise available, the following TABLE of recommended tolerances can be employed, which tolerances are separately established for different ranges of shaft rotational speed (expressed in RPM) during normal operation.

TABLE

| Speed (RPM) | RECOMMENDED TOLERANCES | | | |
|---|---|---|---|---|
| | Excellent | | Acceptable | |
| | Offset (mils) | Angle (mils/inch) | Offset (mils) | Angle (mils/inch) |
| <500 | 5.0 | 1.5 | 6.0 | 2.0 |
| 500–1250 | 4.0 | 1.0 | 5.0 | 1.5 |
| 1250–2000 | 3.0 | 0.5 | 4.0 | 1.0 |
| 2000–3500 | 2.0 | 0.3 | 3.0 | 0.5 |
| 3500–7000 | 1.0 | 0.25 | 2.0 | 0.3 |
| >7000 | 0.5 | 0.2 | 1.0 | 0.25 |

In a typical prior art approach, the amount of actual offset misalignment and the amount of actual angle misalignment are individually compared to the offset and angle tolerance limits for each of the two planes, horizontal and vertical, without taking into account the combined effect of the misalignment components. Thus, if the offset and angularity misalignment components are individually within a particular tolerance range (e.g. "acceptable"), but near their respective outer limits, the overall misalignment is likely not especially acceptable, and certainly is not as good as would be the case if one of the misalignment components were well within the tolerance range.

For example, assuming the shafts of a machine set rotate during operation at a speed within the range of 1250 to 2000 RPM, and the amount of offset misalignment was determined to be 2.9 mils (near the 3.0 mil outer limit of the "excellent" tolerance range for offset) and the amount of angle misalignment was determined to be 0.1 mils per inch (well within the "excellent" tolerance range for angularity), then the alignment would be considered as "excellent", and machine moves to improve alignment would not be required. If, for this same RPM range, the amount of offset misalignment was determined again to be 2.9 mils, but the amount of angular misalignment 0.4 mils per inch (near the 0.5 mils per inch outer limit of the "excellent" tolerance range for angularity), then the alignment would again be indicated as "excellent". However, the alignment in fact would not be nearly as good as in the first example.

In accordance with the invention, rather than employing a tolerance chart like the foregoing where the offset and angularity misalignment components are separately considered, graphical tolerance charts like those of the accompanying FIGS. 6, 7, 8, 9, 10 and 11 are employed. The charts of these six FIGS. correspond, in this example, to the six individual lines of the TABLE of RECOMMENDED TOLERANCES chart hereinabove. Each of these graphical tolerance charts employs an x–y coordinate system where an offset limit is plotted along the horizontal or x axis, an angularity limit is plotted along the vertical or y axis, and "excellent" and "acceptable" tolerance ranges are denoted as portions of ellipses having axes defined as misalignment offset and angle limits along the respective axes.

The actual amount of misalignment can then be expressed as a single point within the x–y coordinate system, which point will be either within the "excellent" tolerance range, within the "acceptable" tolerance range, or entirely out of tolerance. Plotting each misalignment condition as a single point in an x–y coordinate system provides a true indication of the alignment condition.

For convenience, in the representative tolerance charts of FIGS. 6–11, offset and angle are always viewed as positive numbers; thus, the absolute value of the actual offset misalignment and angular misalignment components are employed. The misalignment information is intended to be used as an alignment tolerance indication only, not for aligning the machines.

In the context of the invention it should be noted that rarely can the shafts of a machine set be aligned from one set of readings. Usually, at least two cycles of measurement to establish a measured data set and corresponding machine moves are required, and typically more. Alignment personnel must repeat the taking of alignment readings and performing machine moves until the equipment is aligned to specified tolerances.

Figure 12:
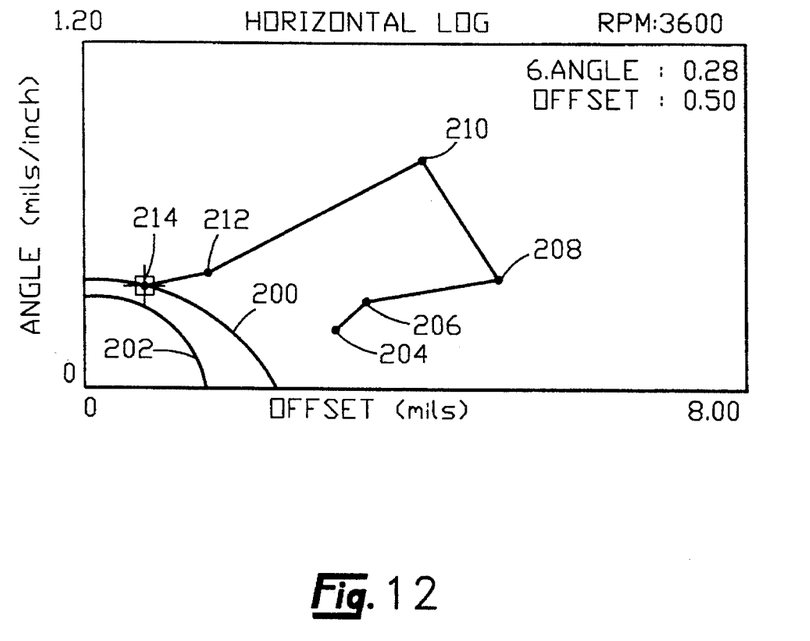
FIG. 12 is a representation of a graphical log display in a horizontal plane.
Figure 13:
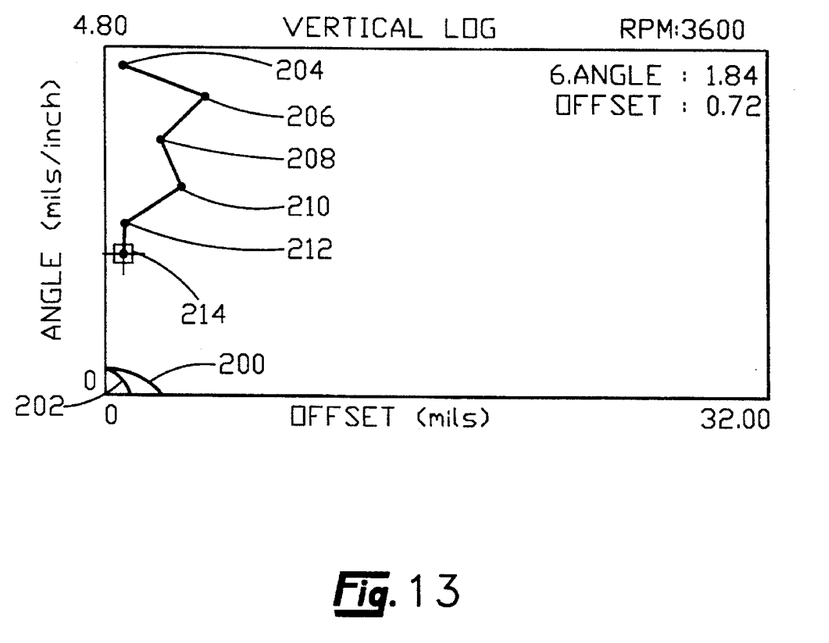
FIG. 13 is a representation of a graphical log display in a vertical plane.

The components within the alignment analyzer 42 operate to present, on the display device 120, graphical displays such as are depicted in FIGS. 12 and 13, corresponding to the horizontal and vertical planes respectively.

FIG. 12 more particularly shows an actual graphical representation generated on the display device 46, which representation may be designated a "Horizontal Log Display". Visible in FIG. 12 are portions 200 and 202 of two ellipses corresponding respectively to "acceptable" and "excellent" tolerance limits, as discussed above. Also shown in the display representation of FIG. 12 are a series of points 204, 206, 208, 210, 212 and 214, interconnected by straight lines, representing a log or history of the results of a succession of machine moves intended to bring a pair of shafts of a machine set into alignment. These culminate in the point 214, also denoted by a cursor, indicating the alignment status in the horizontal plane after the most recent reading, which, as can be seen, is just within the "acceptable" tolerance range denoted by the ellipse portion 200.

FIG. 13 is a corresponding vertical log display, showing the effect of the same machine moves with reference to misalignment in the vertical plane, corresponding misalignment points being denoted by primed reference numerals. In FIG. 13, the ellipses 200' and 202' are much smaller than in FIG. 12 due to the much larger scale required to accommodate the much greater misalignment in the vertical plane in this particular example. Thus, at the most recent point 214' shown, misalignment in the vertical plane is well out of tolerance, while, in the horizontal plane depicted in FIG. 12, the point 214 is within at least the "acceptable" range.

Recording the number of moves required to bring the machine set into alignment allows a measure of performance of individuals performing the alignment jobs. The misalignment condition data points may be stored within the memory 134 of the alignment analyzer in several ways. For example, the misalignment condition data points may be stored as their actual offset and angularity misalignment coordinates, or they may be stored in representative form as the underlying measured offset data set from which offset and angle misalignment are calculated.

As just described, in accordance with the present invention, from the separate offset and angular misalignment components, a single "amount" of misalignment is determined, which may be represented as a single point in a coordinate system, such as an x–y coordinate system. It will be appreciated, however, that there are equivalents in other coordinate systems. For example, the single point may be represented in a polar coordinate system by specifying a magnitude (equivalent to distance from the origin in either FIG. 12 or FIG. 13) and an angle, which angle is the angle between a straight line connecting the origin and the point and a reference axis, conventionally the horizontal or x-axis. It will correspondingly be appreciated that conversion between such coordinate systems is a straightforward matter.

As another aspect of the invention, the amounts of offset and angular misalignment in a given plane can be computationally combined to determine a combined misalignment amount for that plane, and then compared either to a value representing a tolerance limit for "acceptable" alignment, to a value representing a tolerance limit for "excellent" alignment, or to both values.

Thus, the amounts of offset and angular misalignment can be expressed as a data point $X_D$, $Y_D$. A line drawn from the origin to the data point $X_D$, $Y_D$ is described by the equation $$y = \frac{Y_D}{X_D} x.$$

Either of the ellipses is described by the equation $$\frac{x^2}{a^2} + \frac{y^2}{b^2} = 1,$$

where a and b are the offset and angularity tolerance limit values for either the "excellent" or "acceptable" tolerance range, depending on which ellipse is being described. The line drawn from the origin to the data point $X_D$, $Y_D$ intersects the ellipse at an intersection point $X_I$, $Y_I$. At the intersection on the ellipse, $$\frac{X_I^2}{a^2} + \frac{Y_I^2}{b^2} = 1.$$

At the intersection on the line, $$\frac{Y_D}{X_D} X_I = Y_I.$$

Combining these last two equations, $$X_I = \sqrt{\frac{1}{\left(\frac{1}{a^2} + \frac{Y_D^2}{X_D^2 b^2}\right)}} \text{ and } Y_I = \sqrt{\frac{1}{\left(\frac{X_D^2}{Y_D^2 a^2} + \frac{1}{b^2}\right)}},$$

giving the intersection point $X_I$, $Y_I$.

The tolerance limit for either "acceptable" or "excellent" alignment (depending on which set of values is employed for a and b) can thus be expressed as $\sqrt{X_I^2 + Y_I^2}$. The distance from the origin to the data point $X_D$, $Y_D$, which distance represents the combined misalignment amount, is correspondingly expressed as $\sqrt{X_D^2 + Y_D^2}$. The combined misalignment amount $\sqrt{X_D^2 + Y_D^2}$ is then compared to $\sqrt{X_I^2 + Y_I^2}$ (which represents the tolerance limit) to determine whether the combined misalignment amount is inside or outside the tolerance limit. If desired, a percentage ratio can also be calculated, expressing how far the combined misalignment amount is inside or outside the tolerance limit.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An alignment analyzer for facilitating the alignment of at least one machine set including first and second rotatable shafts connected respectively to first and second machines employing an alignment fixture for measuring a pair of offsets at a plurality of shaft rotational positions to establish a measured data set, said alignment analyzer comprising:

a display device capable of displaying a graphical representation in a coordinate system having a first coordinate representing offset misalignment and a second coordinate representing angular misalignment; and elements operating to calculate, based on the measured offset data set, the amount of offset misalignment, if any, and the amount of angular misalignment, if any, of the shafts in at least one plane, and to display combined offset and angular misalignment as a point in the coordinate system on said display device, said point being positioned with respect to the first coordinate based on the calculated amount of offset misalignment and being positioned with respect to the second coordinate based upon the calculated amount of angular misalignment.

2. An alignment analyzer in accordance with claim 1, wherein said elements operating to calculate and display further operate to display in the coordinate system on said display device a curve representing an acceptable tolerance range, the displayed point and the curve together indicating whether the combined offset and angular misalignment within the at least one plane is within or without the acceptable tolerance range.

3. An alignment analyzer in accordance with claim 2, wherein said elements operating to calculate and display further operate to display in the coordinate system on said display device a curve representing an excellent tolerance range, the displayed point and the curve together indicating whether the combined offset and angular misalignment within the at least one plane is within or without the excellent tolerance range.

4. An alignment analyzer in accordance with claim 1, wherein said display device is capable of displaying a graphical representation in an x–y coordinate system, and wherein said elements operate to display combined offset and angular misalignment as a point in the x–y coordinate system.

5. An alignment analyzer in accordance with claim 4, wherein said elements further operate to display in the x–y coordinate system on said display device a curve representing an acceptable tolerance range, which curve is at least a portion of an ellipse having axes defined as offset misalignment and angular misalignment limits along x and y axes of the x–y coordinate system, the displayed point and the curve together indicating whether the combined offset and angular misalignment within the at least one plane is within or without the acceptable tolerance range.

6. An alignment analyzer in accordance with claim 5, wherein the offset misalignment and angular misalignment limits defining the acceptable tolerance range ellipse axes are based on shaft rotational speed during normal operation.

7. An alignment analyzer in accordance with claim 4, wherein said elements further operate to display in the x–y coordinate system on said display device a curve representing an acceptable tolerance range and a curve representing an excellent tolerance range, which curves are each at least a portion of an ellipse having axes defined as misalignment offset and angle limits along x and y axes of the x–y coordinate system, the displayed point and the curves together indicating whether the combined offset and angular misalignment within the at least one plane is within or without the acceptable tolerance range and whether the combined offset and angular misalignment within the at least one plane is within or without the excellent tolerance range.

8. An alignment analyzer in accordance with claim 7, wherein the offset misalignment and angular misalignment limits defining the acceptable tolerance range ellipse axes and the offset misalignment and angular misalignment limits defining the excellent tolerance range ellipse axes are based on shaft rotational speed during normal operation.

9. An alignment analyzer in accordance with claim 4, wherein said elements operate to calculate, based on the measured data set, the amount of offset misalignment, if any, and the amount of angular misalignment, if any, of the shafts in two planes, and to selectively alternately display combined offset and angular misalignment for each of the planes as a point in the x–y coordinate system on said display device.

10. An alignment analyzer in accordance with claim 1, wherein said elements operate to calculate, based on the measured data set, the amount of offset misalignment, if any, and the amount of angular misalignment, if any, of the shafts in two planes, and to selectively alternately display combined offset and angular misalignment for each of the planes as a point in the coordinate system on said display device.

11. An alignment analyzer in accordance with claim 1, which further comprises:

a memory for storing a plurality of combined offset and angular misalignment data points for the machine set corresponding to a plurality of measured data sets established during the course of aligning the machine set; and wherein said elements further operate to simultaneously display the plurality of offset and angular misalignment data points as points in the x–y coordinate system on said display device.

* * * * *